Figure 1:
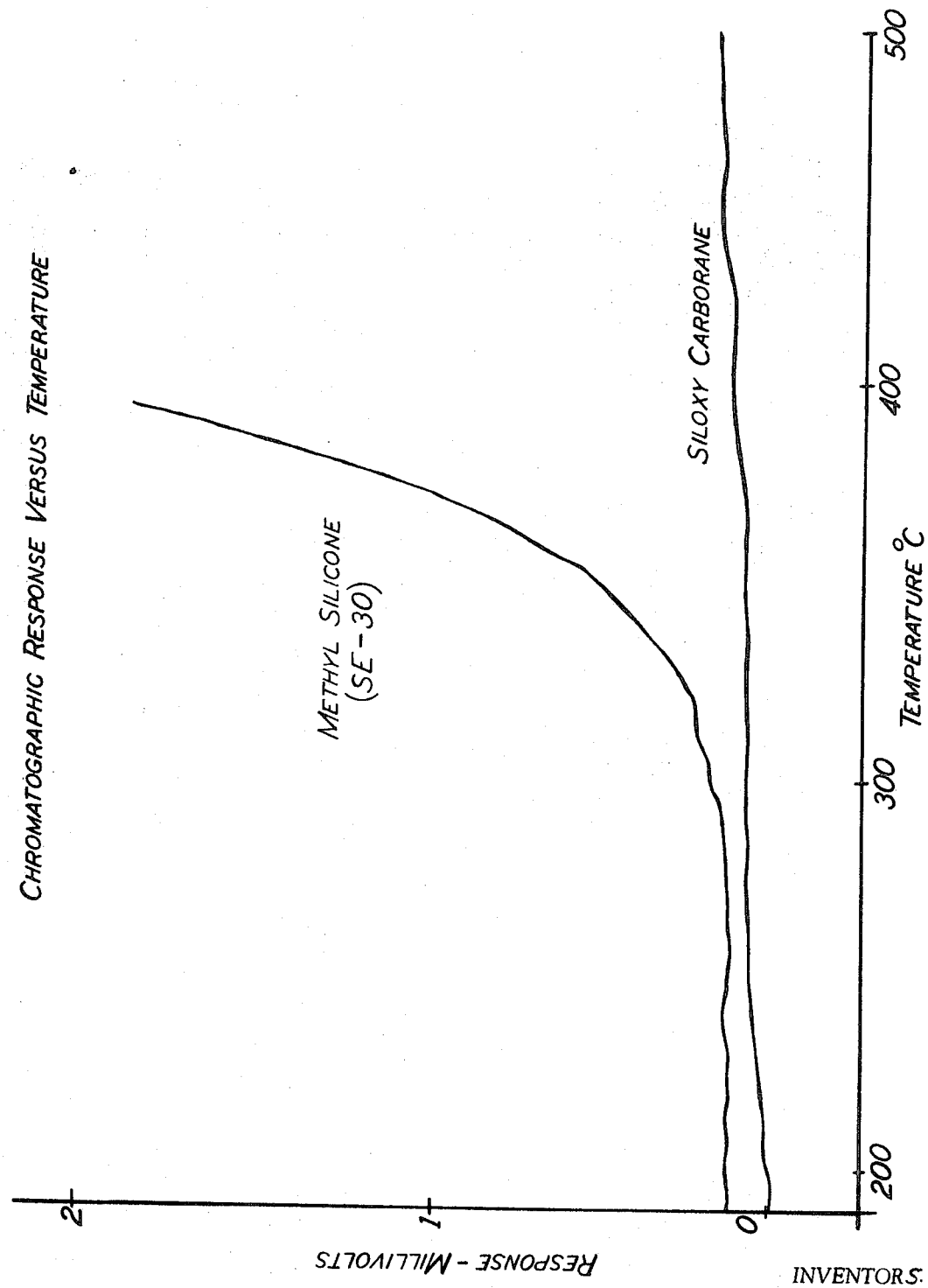

United States Patent
Finch et al.

[15] 3,660,966
[45] May 9, 1972

[54] METHOD OF CHROMATOGRAPHIC ANALYSIS USING SILOXY CARBORANYL PARTITIONING PHASES

[72] Inventors: Richard W. Finch, Northford; Willard Alan Nichols, Madison, both of Conn.

[73] Assignee: Olin Corporation

[22] Filed: Aug. 10, 1970

[21] Appl. No.: 62,624

Related U.S. Application Data

[63] Continuation-in-part of Ser. No. 879,696, Nov. 25, 1969, abandoned.

[52] U.S. Cl. ............................................................55/67
[51] Int. Cl. ..................................................B01d 15/08
[58] Field of Search ...............210/31, 198; 55/67, 197, 386; 73/23.1

[56] References Cited

UNITED STATES PATENTS 3,263,401  8/1966  Supina..........................................55/67
3,464,183  9/1969  Gordon..........................................55/67

Primary Examiner—J. L. De Cesare
Attorney—Eugene Zagarella, Jr., Gordon D. Byrkit, Donald F. Clements, F. A. Iskander and Thomas P. O'Day

[57] ABSTRACT

Vapor phase chromatography wherein a siloxy carboranyl liquid partitioning phase having recurring structural units of the following formula is used:

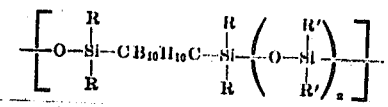

where each R and R' substituent is an independently selected alkyl group of 1 to 8 carbon atoms or aryl group of up to 10 carbon atoms and $x$ is 1 to 5. These siloxy carboranyl partitioning phases are particularly useful at high temperatures.

8 Claims, 4 Drawing Figures

METHOD OF CHROMATOGRAPHIC ANALYSIS USING SILOXY CARBORANYL PARTITIONING PHASES

This application is a continuation-in-part of copending application U.S. Ser. No. 879,696 filed Nov. 25, 1969, and now abaondoned.

This invention relates to the use of siloxy carboranyl liquid partitioning phases in vapor phase chromatography.

Vapor phase chromatography (VPC) is an extremely versatile analytical technique which is used to separate components for quantitative and qualitative analysis. It is a nondestructive technique which utilizes micro amounts of sample and can perform part per billion analyses in a matter of minutes. Because of its versatility of technique, ease of operation and maintenance and a relatively moderate purchase price of equipment and material, VPC has gathered wide acceptance. Continued development programs directed toward improving VPC have resulted in a wide variety of available detectors, intricate temperature programing modes, a multitude of partitioning phases and new data reduction systems.

However, despite its wide use and continued development, there has been little improvement in the area of usable temperature limit. Since methyl silicon gum (General Electric SE-30) was introduced as a chromatographic phase, it has been generally accepted as the high temperature phase and its upper temperature limit of 350° C. has generally been considered as the usable limit for VPC. This is particularly disadvantageous because high boiling components such as polymers, reaction residues, metallo-organics, petroleum by-products, pesticides, biochemical materials, many inorganic materials, etc., will not elute from the column and unfortunately, this area of high boilers often constitutes a major portion of the sample.

This invention relates to VPC using a siloxy carboranyl liquid partitioning phase which results in a high temperature limit and thereby appreciably extends the usable range of VPC. This is particularly advantageous because many new chemical areas may thereby be susceptible to analysis by this technique. In addition, the lifetime of the chromatographic columns and detectors may be increased and post separation analyses such as trapping or direct mass spectrometer coupling, will not be subject to phase contamination.

Basically, the chromatographic process is conducted in a VPC column wherein a randomly packed network of inert solid support material is held. The support material is coated with a partitioning phase and an inert carrier gas transports a volatile mixture through the column and into contact with the partitioning phase. The volatiles are first adsorbed and then desorbed by the phase and if this rate is different for the various components of the mixture, they become separated and are detected as they exit from the column.

One of the main problems of high temperature chromatography is finding partitioning phases capable of withstanding high temperatures. The high temperatures affect the partitioning phase in three ways: (1) thermal decomposition, (2) interaction with components of samples and (3) simple vaporization or carrying away by the carrier gas. The latter effect results in eventual shortening of retention times, broadening of peaks and loss of resolution and changes in relative retention times of different peaks in the sample. In addition, the detectors can be desensitized or destroyed and if the phase does get past the detectors, any isolation of the original sample components will be contaminated by phase.

This invention relates to the use of a liquid partitioning phase in a packed column wherein the previously discussed problems concerning the use of partitioning phases unsuitable for high temperature operation are eliminated or minimized.

More particularly, this invention involves the use of a siloxy carboranyl liquid partition phase having recurring structural units of the formula:

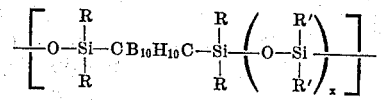

where each R and R' is an independently selected alkyl group of one to eight carbon atoms or aryl hydrocarbon group of up to 10 carbon atoms and $x$ is 1 to 5. Thus, for example the R and R' substituent may be methyl, ethyl, butyl, octyl, phenyl, tolyl, xylyl or naphthyl.

Basically, the compounds used in this invention are prepared by reacting an alkoxy substituted neocarborane with a halogen containing silane or siloxane or by reacting a dialkoxy silane with organosiloxanyl carborane. More particularly, the compounds used in this invention may be prepared by the methods as disclosed in U.S. Pat. Nos. 3,388,091, 3,388,092 and 3,388,093.

Generally the compounds used in this invention have molecular weights of from about 7,000 to about 100,000 with the preferred range being from about 12,000 to about 50,000. These compounds, while particularly useful as partitioning phases in the higher temperature range of 350° to 650° C. may also be used at any of the lower temperatures wherein VPC is carried out. Additionally, the siloxy carboranyl phase material of this invention may be useful at temperatures greater than 650° C. since not all the phase material will volatilize off at 650° C. For example, a thermogram (TGA similar to FIG. 2) run on the siloxy carboranyl phase at temperatures up to 1,000° C. still showed significant quantities of the phase material that we not volatilized off.

The siloxy carboranyl material of this invention is generally prepared for use in chromatographic analyses by dissolving in a suitable solvent such as ethers, ketones, aromatic hydrocarbons and other substituted hydrocarbons as exemplified by diethyl ether, methylene chloride, methyl ethyl ketone, chlorobenzene, bromobenzene, aniline, xylene, N-methyl pyrolidone, decaline, etc. The liquid phase is then deposited onto a solid support material which is packed into a column. The inert solid support material is generally made from diatomaceous earth such as is available commercially under the name Chromosorb W (Johns-Manville). However, any inert support material may be used providing it is capable of withstanding the temperature at which the VPC will be carried out.

FIGS. 1–4 are graphic evaluations of the temperature stability of different liquid phases.

The problem of running the chromatograph column at a temperature is illustrated in FIG. 1 wherein comparisons of a heated column containing methyl silicon gum (SE-30) as the partitioning phase with another column containing the siloxy carboranyl phase of this invention is made. A 15 percent by weight siloxy carborane of the formula:

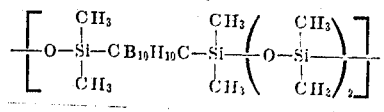

was placed on a Chromosorb-W support and run on a F and M Scientific Model 700 chromatographic instrument in a similar manner as a methyl silicone column. The temperature was programmed from 100° to 460° C. at 20° C. per minute. As noted in FIG. 1, a point is reached where the detectors begin to respond as if material was being chromatographed. Actually, what is happening is that the phase is being volatilized off the support and being carried to the detector. The temperature at which this begins to occur becomes the upper operating limit. As can be seen from the figure, methyl silicon begins to volatize off at about 350° C. while the carborane based partitioning phase of this invention goes beyond 500° C. with no volatilization being detected.

Figure 2:
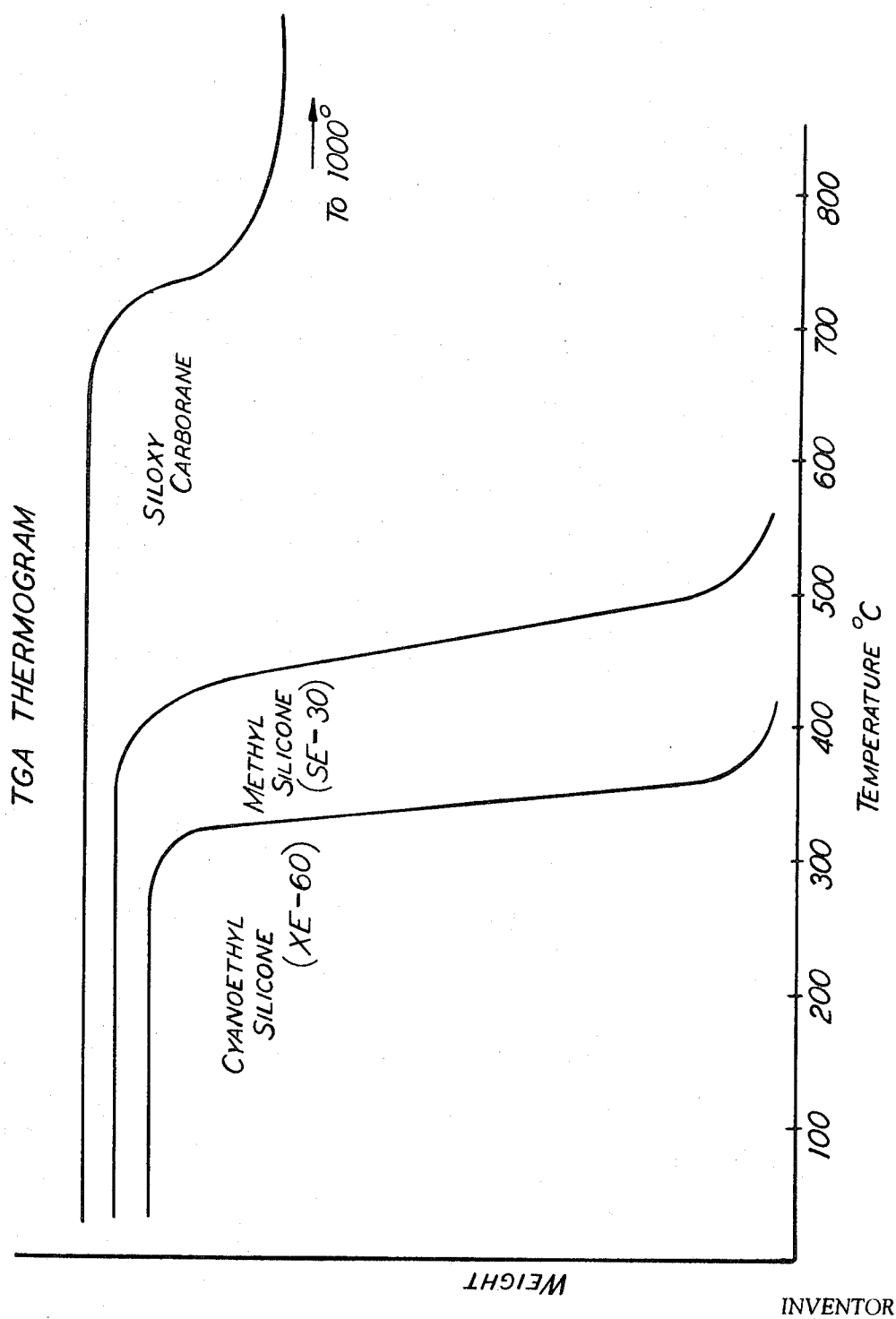

Another evaluation of the temperature stability of different phases is shown in FIG. 2. This figure shows the results of a Thermal Gravimetric Analysis (TGA) using methyl silicone gum (SE-30), 25 percent cyanoethyl silicone (General Electric XE-30) and the siloxy carborane of this invention (same material as used in FIG. 1) as phase sample material. Basically, in TGA a small sample of material is heated in a selected atmosphere and the change in weight recorded as a function of temperature. As noted earlier, when a VPC phase material is heated in a column, a point is reached where it loses weight (volatilize and hence, a direct similarity is seen between TGA and the action of temperature on the VPC column.

The results noted in FIG. 2, show the cyanoethyl silicon beginning to volatilize at about 225° C., the methyl silicon at about 350° C. and the siloxyl carboranyl phase of this invention at about 625° C. These results show the siloxy carboranyl phase at nearly 300° C. higher than the industry standard, methyl silicon.

The following examples are illustrative of this invention.

EXAMPLE I

Initially a packed column containing the partitioning phase was prepared by dissolving 1.55 grams of siloxy carboranyl material of the formula:

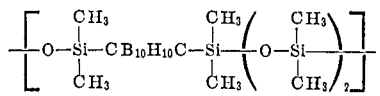

having molecular weight of about 20,000 in a solvent methylene chloride. An 8.5 gram sample of inert carrier material Chromosorb-W - DMCS (80–100 mesh) was wet with the same solvent and then mixed with the carborane solution. The solution with the inert support material was then placed into a flat enamel pan on a steel plate with occasional stirring, the solvent was evaporated off into a hood draft. The support material holding the partitioning phase was then packed into a 5.5 foot length by ⅛-inch O.D. stainless steel tubing. This tube was then placed in a gas chromatographic instrument (F and M Scientific Model 700) which was equipped with thermal conductivity detectors.

A solution consisting of the distillation residue of a commercial aromatic amine mixture (containing various isomers of toluene diamine) was dissolved in methanol to make up a 10 percent by weight solution. A 3 microliter portion of this solution was injected using a hypodermic syringe into the previously prepared column containing the supports with the siloxy carboranyl phase held thereon. Helium was used as an inert carrier gas and was injected at a flow rate of 40 cc. per minute with an injection port temperature of 420° C. An oven temperature was programmed at a rate of 20° C. per minute starting at 200°C.

Figure 3:
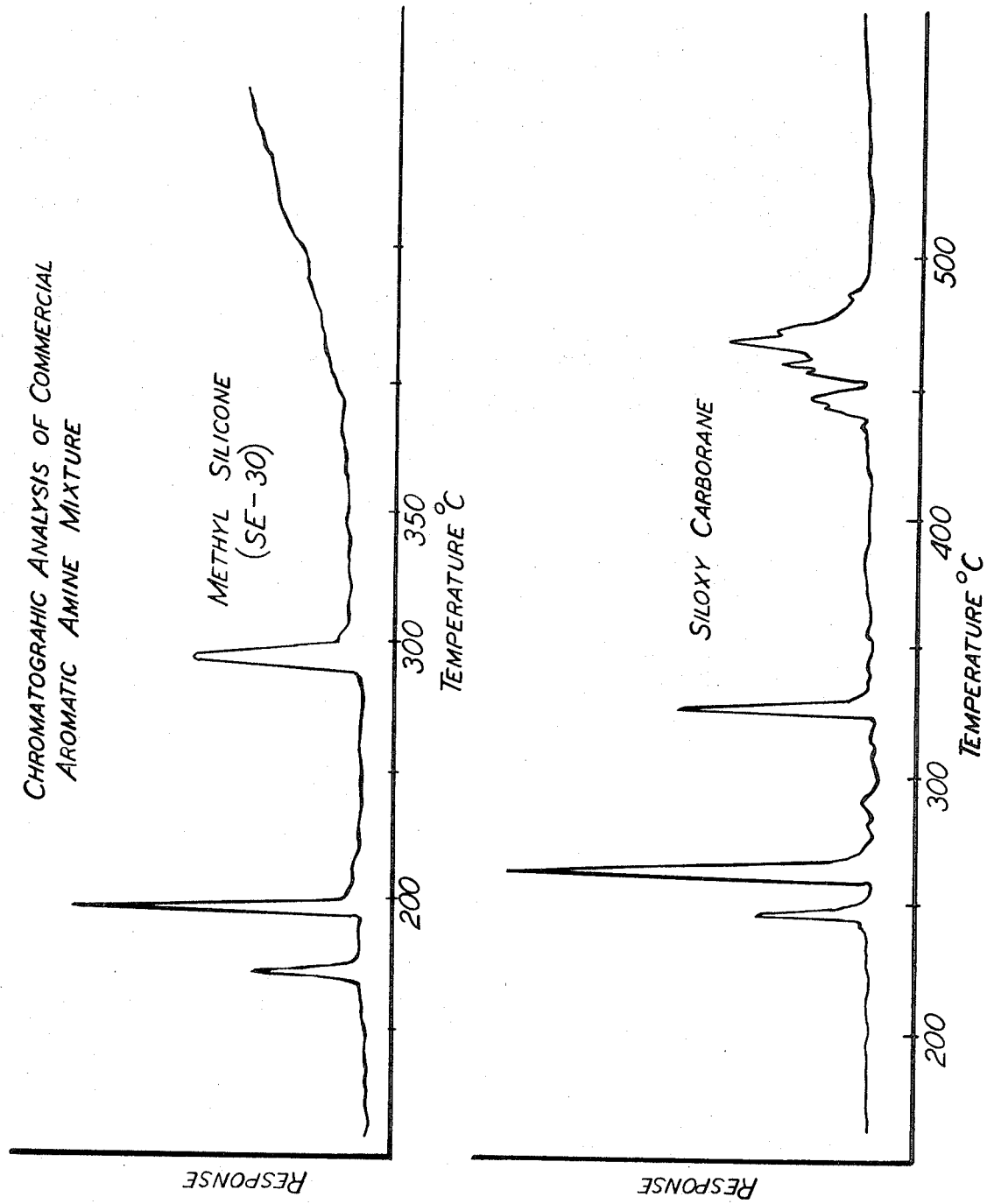

The chromtographic analysis of this sample is shown in FIG. 3 along with a comparative analysis performed using a methyl silicon phase under the same operating conditions. As noted, the siloxy carboranyl phase of this invention showed residual components in the 450° to 500° C. range whereas the methyl silicone phase showed no residual components after about 300° C.

EXAMPLE II

A packed column was prepared in a manner similar to that described in Example I except that the siloxy carboranyl material used had the formula

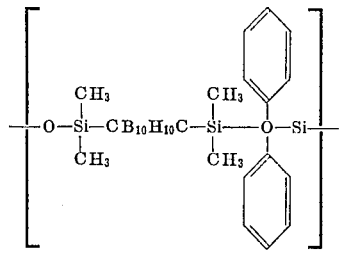

In order to decrease further polymerization of the phase in the column, 200 microliters of N,O-Bis-(trimethylsilyl)-acetamide were injected onto the column in 50 microliter portions at about 50° C. increments from ambient temperature to 200° C. A 10 percent by weight sample mixture comprising halogenated alcohols, epoxides, and telomers resulting from the reaction thereof was made and analysis performed in the same manner as Example I.

Figure 4:
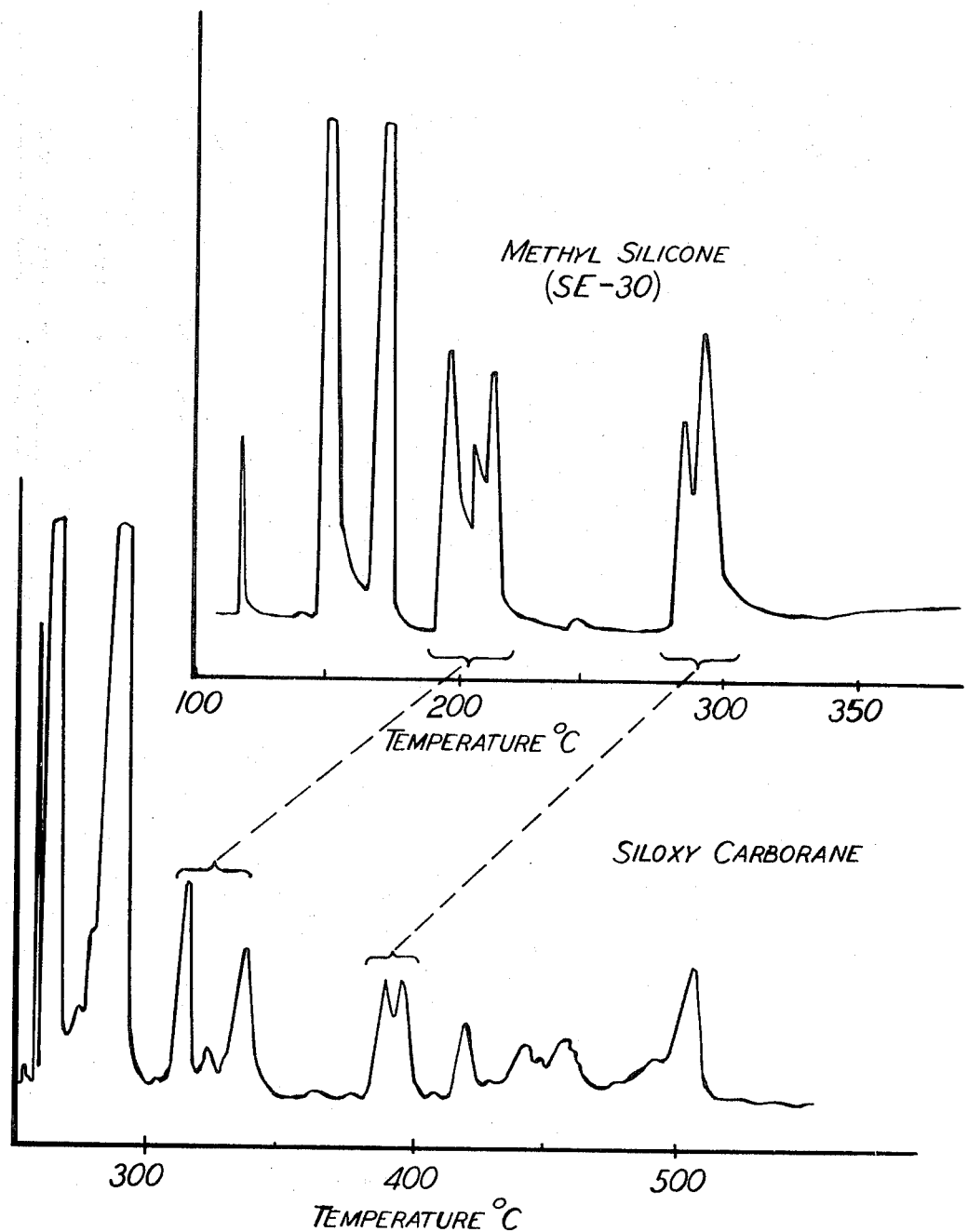

The results are shown in FIG. 4 along with a comparative analysis performed using a methyl silicone phase (SE-30). As noted, using the siloxy carboranyl phase, several residual components were shown from 300° to about 500° C. whereas the methyl silicone phase showed no residual components after about 300° C.

EXAMPLE III

A packed column containing the partitioning phase was prepared by dissolving 1.55 grams of siloxy carboranyl material of the formula:

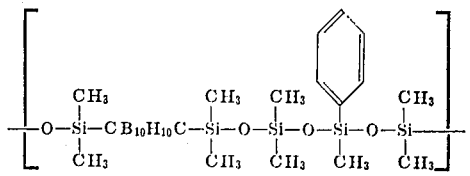

having molecular weight of about 17,000 in a solvent diethyl either. An 8.5 gram sample of inert carrier material, Chromosorb-W-DMCS (80-100 mesh) was wet with the same solvent and then mixed with the carborane solution. The column packing was then prepared in a manner similar to that described in Example I. This material was packed into a 5.5 foot length by ⅛-inch O.D. stainless steel tubing. The column was placed in a gas chromatographic instrument (F and M Scientific Model 700) equipped with flame ionization detectors. The column was conditioned at 400° C. for 24 hours and then temperature programmed from 100° to 500° C. at 10° C./minute.

A 30 percent solution (by volume) consisting of a mixture of five- and six-ring polyphenyl ethers in toluene was then chromatographed by injecting 1 microliter of the solution into the instrument while maintaining the column oven at 360° C. The chromatogram for this sample indicated that toluene eluted within 15 seconds, three isomers of the five-ring material eluted after between 2.5 and 3.5 minutes and the six-ring material eluted after from 8.75 to 10.5 minutes.

What is claimed is:

1. In a method of performing a vapor phase chromatographic analysis on a volatile sample material wherein a liquid partitioning phase is used, the improvement comprising using as said partitioning phase a material having recurring structural units of the formula:

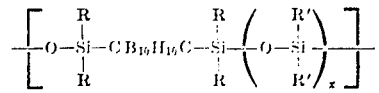

where each R and R' substituent is independently selected from the group consisting of alkyl of from one to eight carbon atoms and aryl of up to 10 carbon atoms, x is 1 to 5 and said material has a molecular weight of from about 7,000 to about 100,000.

2. The method of claim 1, where x is 1.
3. The method of claim 2, where each R is $CH_3$ and each R' is phenyl.
4. The method of claim 1, where x is 2.
5. The method of claim 4, where each R and R' is $CH_3$.
6. The method of claim 1, wherein x is 3.
7. The method of claim 6, wherein said partitioning phase material has recurring structural units of the formula:

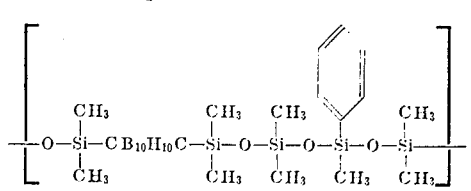

8. The method of claim 1, wherein said material has a molecular weight of from about 12,000 to about 50,000.

* * * * *